(12) United States Patent
Guarin Aristizabal et al.

(10) Patent No.: US 12,313,729 B2
(45) Date of Patent: May 27, 2025

(54) DISTRIBUTED RADAR SYSTEM

(71) Applicant: NXP USA, INC., Austin, TX (US)

(72) Inventors: Gustavo Adolfo Guarin Aristizabal, Munich (DE); Mark Steigemann, Ebstorf (DE)

(73) Assignee: NXP USA, Inc., Austin, TX (US)

( * ) Notice: Subject to any disclaimer, the term of this patent is extended or adjusted under 35 U.S.C. 154(b) by 632 days.

(21) Appl. No.: 17/643,213

(22) Filed: Dec. 8, 2021

(65) Prior Publication Data

US 2022/0196826 A1    Jun. 23, 2022

(30) Foreign Application Priority Data

Dec. 23, 2020 (EP) .................................... 20216934

(51) Int. Cl.
*G01S 13/87* (2006.01)
*G01S 7/03* (2006.01)
*G01S 13/931* (2020.01)

(52) U.S. Cl.
CPC .............. *G01S 13/878* (2013.01); *G01S 7/03* (2013.01); *G01S 13/931* (2013.01)

(58) Field of Classification Search
CPC .................................. G01S 13/878; G01S 7/03
See application file for complete search history.

(56) References Cited

U.S. PATENT DOCUMENTS 10,775,481 B1 * 9/2020 Puglielli ............... G01S 7/4091
11,092,683 B2   8/2021 Wu
(Continued)

FOREIGN PATENT DOCUMENTS

DE    102019211431 A1    7/2020

OTHER PUBLICATIONS

Anil, K., "AWR1243 Cascade", Texas Instruments Application Report SWRA574A, Oct. 2017.
(Continued)

*Primary Examiner* — Bernarr E Gregory
*Assistant Examiner* — Hailey R Le (57) ABSTRACT

The disclosure relates to a radar system in which multiple radar transceivers are synchronised with a common clock signal. In example embodiments a radar system (200) comprises: a control module (205); a processing module (206); a plurality of radar transceivers ($201_{1-n}$); and a communications bus (211) connecting the control module (205) to one or more of the plurality of radar transceivers ($201_{1-n}$), wherein the control module (205) is configured to generate a first clock signal and transmit the first clock signal via the communications bus (211) to one or more of the plurality of transceivers ($201_{1-n}$) and to receive radar data from the plurality of transceivers ($201_{1-n}$) via the communications bus (211), wherein each of the plurality of transceivers ($201_{1-n}$) is configured to generate a second clock signal extracted from the first clock signal and to transmit and receive frequency synchronized radar signals based on the second clock signal, and wherein the processing module (206) is configured to: calculate a phase difference between the frequency synchronized radar signals; compensate for the measured phase difference; and process received radar signals from the plurality of transceivers ($201_{1-n}$).

19 Claims, 5 Drawing Sheets

(56) References Cited

U.S. PATENT DOCUMENTS

| | | |
|---|---|---|
| 2016/0018511 A1 | 1/2016 | Nayyar et al. |
| 2016/0245898 A1 | 8/2016 | Li et al. |
| 2018/0145692 A1* | 5/2018 | Doare ..................... H03L 1/00 |
| 2018/0292510 A1 | 10/2018 | Rao et al. |
| 2020/0300965 A1 | 9/2020 | Wu et al. |
| 2020/0341112 A1 | 10/2020 | Itkin et al. |
| 2021/0409011 A1* | 12/2021 | Kim ......................... G06F 1/12 |

OTHER PUBLICATIONS

Starzer, F., "A Novel 77-GHz Radar Frontend with 19-GHz Signal Distribution on RF-PCB Substrate", 2010 Topical Meeting on Silicon Monolithic Integrated Circuits in RF Systems (SiRF), Jan. 11-13, 2010.

* cited by examiner

DISTRIBUTED RADAR SYSTEM

CROSS-REFERENCE TO RELATED APPLICATIONS

This application claims the priority under 35 U.S.C. § 119 of European Patent application no. 20216934.8, filed on 23 Dec. 2020, the contents of which are incorporated by reference herein.

FIELD

The disclosure relates to a radar system in which multiple radar transceivers are synchronised with a common clock signal.

BACKGROUND

In current automotive radar systems, the radar aperture may be increased by cascading multiple transceivers to increase the angular resolution of the complete system. To process data from multiple transceivers coherently, synchronization of both frequency and phase is necessary. This may be achieved by distributing a high frequency local oscillator (LO) signal from a master transceiver to one or more slave transceivers. However, in radar systems the LO signal is typically in the region of 10-100 GHz (for example within the range 25 to 40 GHz). Transmitting such signals over distances greater than a few cm without the use of waveguides is problematic due to substantial transmission losses.

SUMMARY

According to a first aspect there is provided a radar system comprising:
 a control module;
 a processing module;
 a plurality of radar transceivers; and
 a communications bus connecting the control module to one or more of the plurality of radar transceivers,
 wherein the control module is configured to generate a first clock signal and transmit the first clock signal via the communications bus to one or more of the plurality of transceivers and to receive radar data from the plurality of transceivers via the communications bus,
 wherein each of the plurality of transceivers is configured to generate a second clock signal extracted from the first clock signal and to transmit and receive frequency synchronized radar signals based on the second clock signal, and
 wherein the processing module is configured to: calculate a phase difference between the frequency synchronized radar signals; compensate for the measured phase difference; and process received radar signals from the plurality of transceivers.

The radar system is a distributed radar system, in which data from the plurality of transceivers is combined to provide a more accurate picture of the surrounding environment, rather than being analysed separately to provide multiple separate pictures from different views. The plurality of transceivers may be provided on separate circuit boards so that they can be located at separate positions, for example along the front of a vehicle. In alternative arrangements the radar system may be a co-located radar system, in which the plurality of transceivers are located on a common circuit board.

In some examples the control module comprises the processing module, while in others the processing module may be distributed among the control module and the transceivers.

The communications bus may connect the control module to each one of the plurality of radar transceivers, each of the plurality of radar transceivers being configured to receive the first clock signal from the control module via the communications bus.

In some examples, the processing module may be configured to calculate the phase difference between a radar signal transmitted from a first one of the plurality of transceivers and a second one of the plurality of transceivers from a signal transmitted from a first one of the plurality of transceivers and received by the second one of the plurality of transceivers.

In alternative examples, the processing module may be configured to calculate the phase difference between a radar signal transmitted from a first one of the plurality of transceivers and a second one of the plurality of transceivers from signals transmitted and received by each of the first and second ones of the plurality of transmitters and reflected from a common feature.

Each transceiver may be connected to an adjacent transceiver via a data bus, thereby allowing high speed communication between adjacent transceivers, for example to allow chirp start signals to be transmitted and for radar signals and data to be transmitted between transceivers.

Two or more of the plurality of transceivers may be co-located on a common circuit board or package.

Each of the plurality of transceivers may comprise a phase adjuster configured to adjust a phase of the second clock signal, the processing module being configured to operate the phase adjuster to compensate for the calculated phase difference.

According to a second aspect there is provided a method of operating a radar system comprising a control module, a processing module, a plurality of radar transceivers and a communications bus connecting the control module to one or more of the plurality of radar transceivers, the method comprising:
 generating by the control module a first clock signal;
 transmitting by the control module the first clock signal via the communications bus to one or more of the plurality of transceivers;
 generating by one or more of the plurality of transceivers a second clock signal extracted from the first clock signal;
 transmitting and receiving frequency synchronized radar signals by each of the plurality of transceivers based on the second clock signal;
 calculating by the processing module a phase difference between the frequency synchronized radar signals;
 compensating by the processing module for the measured phase difference; and
 processing by the processing module received radar signals from the plurality of transceivers.

The first clock signal may be transmitted to each of the plurality of transceivers via the communications bus.

The method may comprise adjusting a phase of the second clock signal in each of the transceivers with a phase adjuster to compensate for the measured phase difference.

In some examples the processing module may calculate the phase difference between a radar signal transmitted from a first one of the plurality of transceivers and a second one of the plurality of transceivers from a signal transmitted from a first one of the plurality of transceivers and received by the second one of the plurality of transceivers.

In other examples the processing module may calculate the phase difference between a radar signal transmitted from a first one of the plurality of transceivers and a second one of the plurality of transceivers from signals transmitted and received by each of the first and second ones of the plurality of transmitters and reflected from a common feature.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 1:
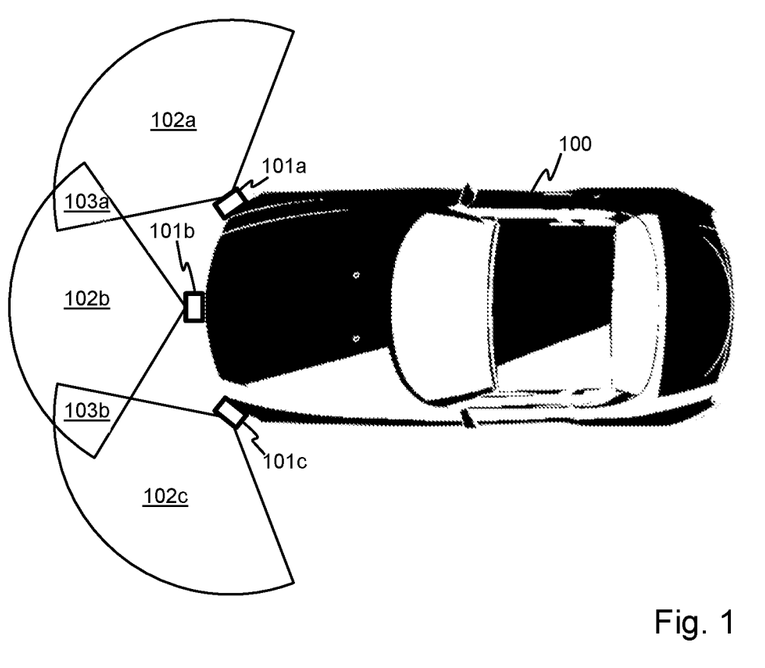
FIG. 1 is a schematic plan view of a vehicle with a distributed radar system having multiple transceivers.

FIG. 1 illustrates a vehicle 100 with a distributed cooperative radar system. The radar system comprises a plurality of transceivers 101a-c positioned along a front portion of the vehicle. Other transceivers may be positioned around the sides or rear of the vehicle. Each transceiver has a respective field of view 102a-c, which overlap in overlapping regions 103a, 103b. Because the transceivers 101a-c are distributed in space across the front of the vehicle 100, information from a wider field of view can be gathered. If the transceivers are connected to operate together cooperatively, the angular resolution of the complete system can also be increased compared with non-cooperative individual transceivers. This, however, requires the transceivers 101a-c to be synchronized both in frequency and in phase to allow information from each transceiver to be combined.

Figure 2:
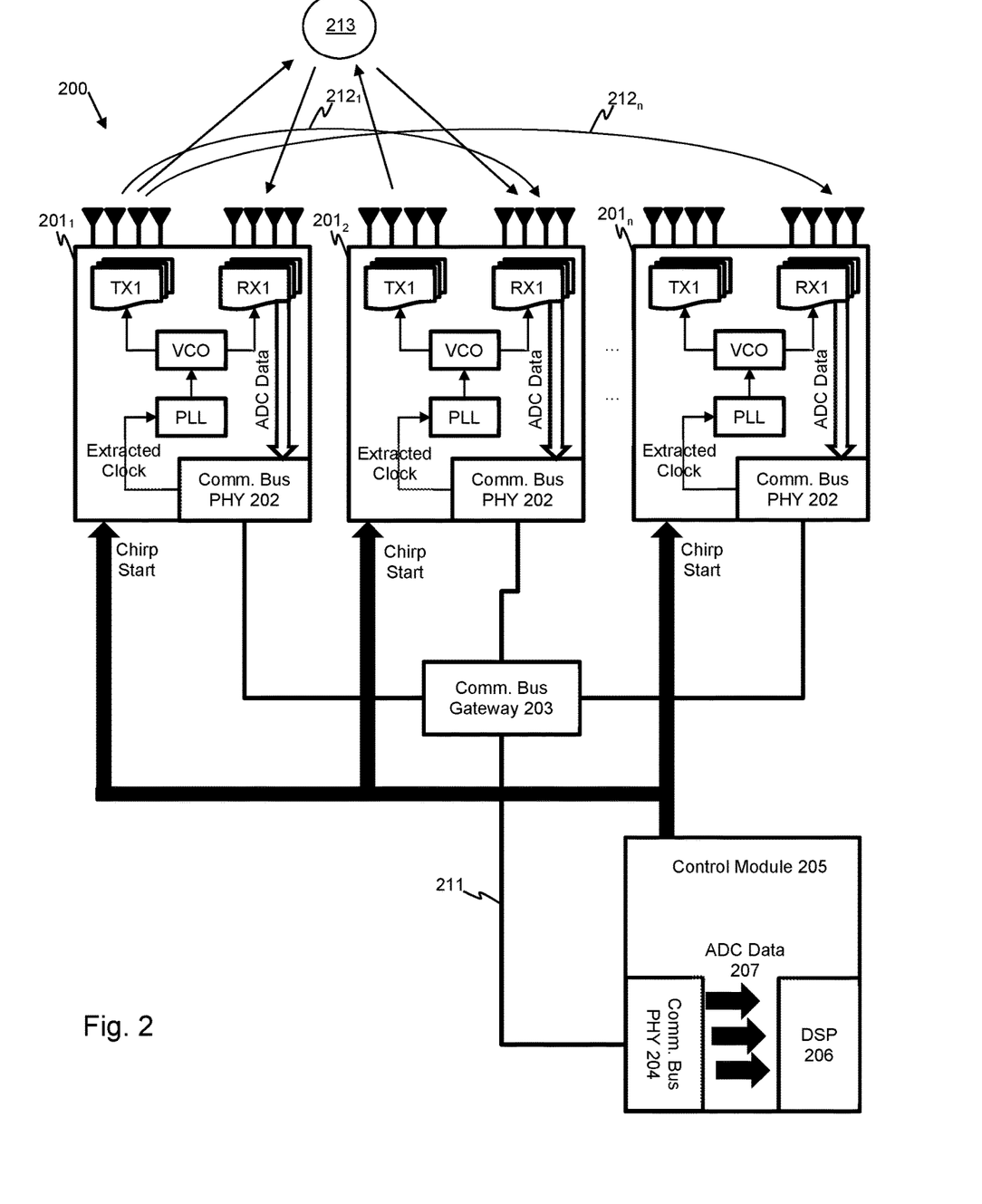
FIG. 2 is a schematic diagram of a distributed radar system with multiple transceivers.

Proposed herein is a radar system that can be used to synchronize and transport data in a coherent distributed system. The transceivers in the system can be co-located or distributed in space. An example radar system 200 is illustrated schematically in FIG. 2. The system 200 uses two signals provided by a control module 205 via a communications bus 211 to a plurality of transceivers $201_{1\ldots n}$ to achieve synchronization in time and frequency of radar signals sent from each transceiver. Each transceiver $201_{1\ldots n}$ comprises a transmitter TX1 and a receiver RX1 with associated antennae for respectively transmitting and receiving radar signals. Separate antennae for transmitting and receiving may be provided, as illustrated in FIG. 2, or common antennae may be used for both transmitting and receiving. The frequency of operation of the transmitter TX1 and receiver RX1 in each transceiver is controlled by a voltage-controlled oscillator VCO and phase-locked loop PLL. A clock signal is provided to the PLL by a communications bus physical layer (PHY) 202. The communications bus PHY 202 in each transceiver $201_{1\ldots n}$ is connected to a communications bus gateway 203, which itself is connected to a communications bus PHY 204 of the control module 205. The control module 205, which may be a microprocessor, comprises the communications bus PHY 204 and a digital signal processor DSP 206, which processes analog to digital converted (ADC) data 207 from each of the transceivers $201_{1\ldots n}$.

The control module 205 provides chirp start signals to each of the transceivers to cause the transceivers $201_{1\ldots n}$ to start each chirp of a radar signal simultaneously. Chirp start signals may be sent to each transceiver via a separate dedicated bus or may be provided as part of a high-speed signal modulated on top of a communication protocol or embedded in the communication protocol. The chirp start signal is a triggering signal that allows timing of the transceivers $201_{1\ldots n}$ at the start of a modulation sequence.

The transceivers $201_{1\ldots n}$ are each connected to the centralized control module 205 with a synchronized communication connection provided via the gateway 203 and communications bus 202 in each transceiver. Each transceiver $201_{1-n}$ recovers the clock signal from the communication bus 202 and uses this as a reference signal, providing an extracted clock signal to the PLL. In this way, all the transceivers $201_{1\ldots n}$ will be synchronized in frequency. The communications buses 202, 204 and gateway 203 may be provided using Ethernet connections.

Alternative communications buses may for example include PCI express or MIPI CSI-2.

Although the frequency of operation of each of the transceivers $201_{1\ldots n}$ is synchronized, the phase will not be synchronized but this can be compensated for. Any phase differences between the transceivers $201_{1\ldots n}$ can be calculated so that any phase difference be compensated. Various options may be used to calculate the phase differences. One option is to use an over the air (OTA) link or coupling from one of the transceivers to the others. In the system 200 of FIG. 2, an OTA link $212_1$, $212_2$ is provided from a first one $201_1$ of the transceivers to each of the other transceivers $201_{2\ldots n}$. According to this option, a phase difference is calculated between a radar signal transmitted from a first one $201_1$ of the plurality of transceivers $201_{1-n}$ and a second one $201_2$ of the plurality of transceivers $201_{1-n}$ from a signal transmitted from a first one $201_1$ of the plurality of transceivers $201_{1-n}$ and received by the second one $201_2$ of the plurality of transceivers $201_{1-n}$). The phase difference between signals from the first and nth transceiver $201_n$ may be similarly calculated using a signal $212n$ transmitted from the first transceiver $201_1$ and received by the nth transceiver $201_n$. In some cases this option may not be available, for example if the transceivers $201_{1-n}$ are relatively located such that direct signals between the transceivers may not be possible. Another option in such cases may be to use as a reference the strongest targets common to all the transceivers $201_{1\ldots n}$ and to calculate a phase difference between the coherent apertures and the noncoherent aperture. In that case, the phase difference between the coherent aperture and the non coherent aperture can be calculated based on the results of a doppler FFT. To calculate the calibrated phase, a convolution between the coherent and the non coherent aperture is calculated for the specific target.

The convolution can be calculated in the frequency domain. This is illustrated in FIG. 2, where signals transmitted from and received by the first and second transceivers $201_{1,2}$ are reflected from a common feature 213. A phase difference can then be calculated by convolution of signals from both transceivers $201_{1,2}$.

In the example in FIG. 2, all radar data is transmitted from the transceivers $201_{1\ldots n}$ to the control module 205 via the communications bus 211. The data is then processed at the control module 205 by the DSP 206.

Figure 3:
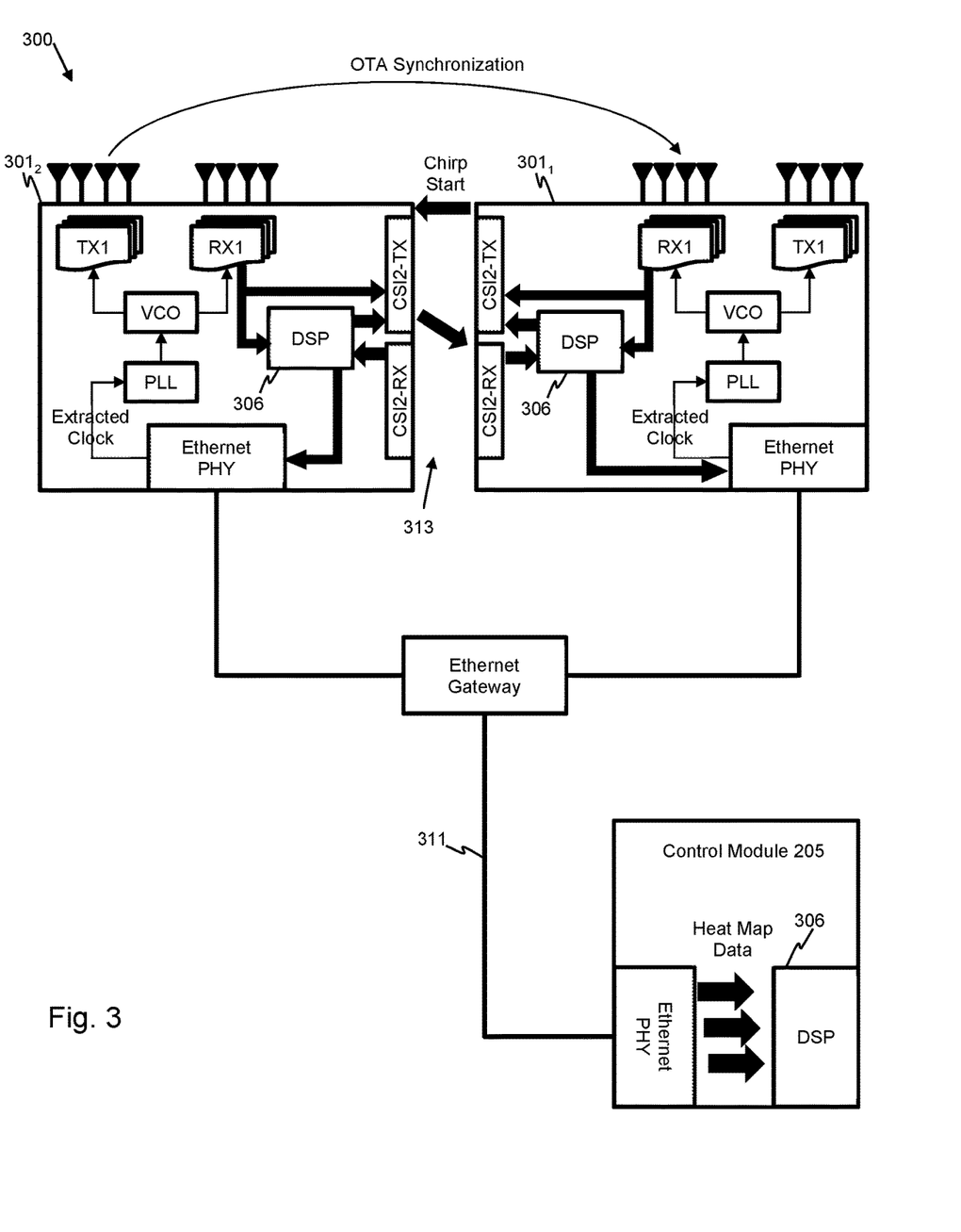
FIG. 3 is a schematic diagram of an example radar system with signal processing performed on each transceiver.
Figure 4:
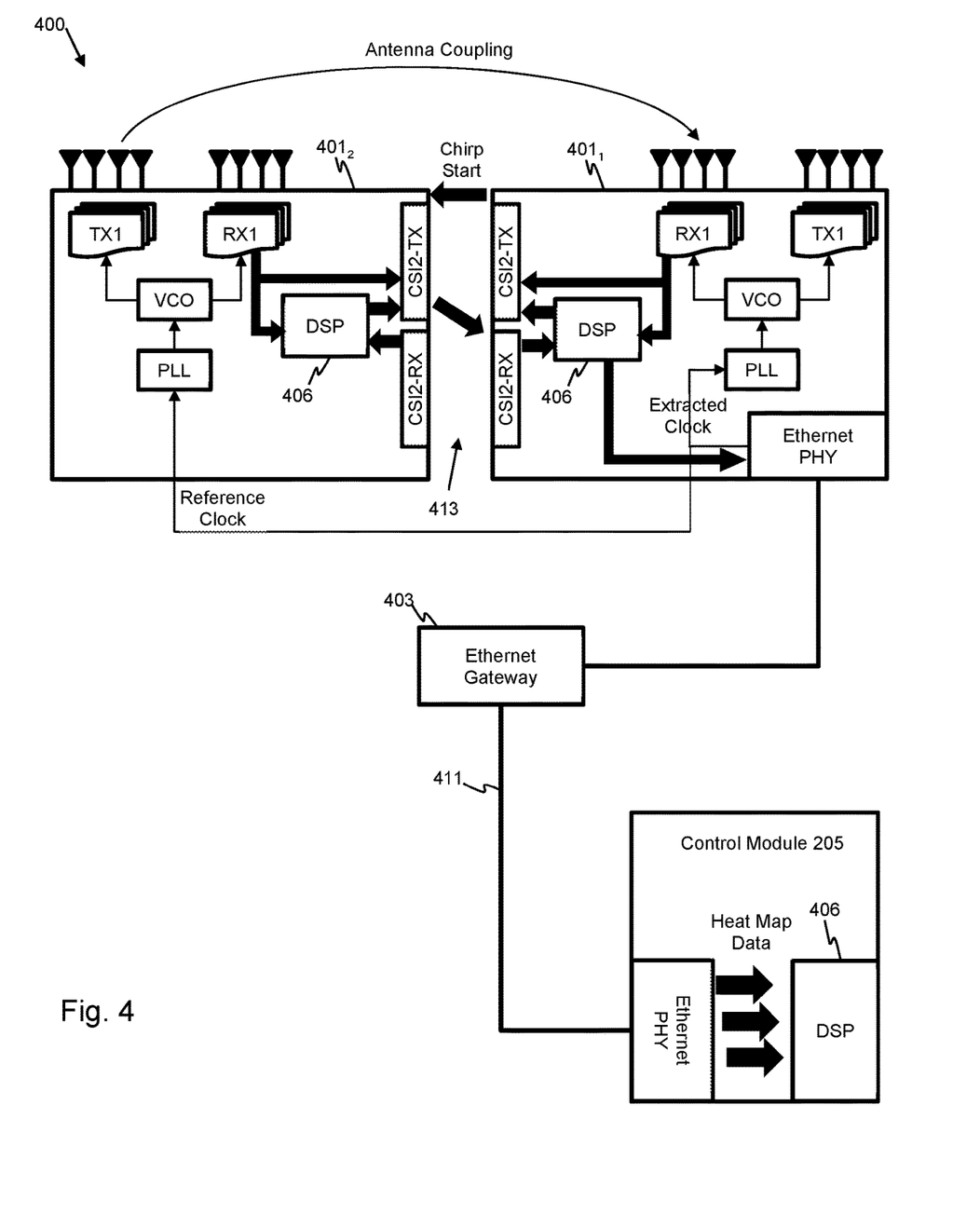
FIG. 4 is a schematic diagram of an alternative example radar system with signal processing performed on each transceiver.

In an alternative implementation, as shown in FIG. 3, each transceiver $301_{1\ldots n}$ may have an integrated microprocessor 306. Data from each transceiver $301_{1\ldots n}$ may be transferred from each transceiver to be centrally processed by the DSP 306 at the control module 205, as shown in FIG. 3, or may be transmitted between the transceivers and transmitted from one transceiver $401_1$ to the control module 205, as shown in FIG. 4. In each implementation, each transceiver $301_{1,2}$ may be connected to an adjacent transceiver $301_{2,1}$ via a data bus 313, 413.

FIG. 3 shows an example radar system 300 with a master transceiver $301_1$ and a slave transceiver $301_2$. Further slave transceivers may also be provided. The master transceiver $301_1$ controls the start of the modulation and acts as a central unit to process data from both transceivers. Transfer of data between the transceivers $301_{1,2}$ can be done via a data bus 313 such as a MIPI-CSI2 communication link, as shown in FIG. 3, or by using another high-speed transfer protocol such as PCI express or by using the communications bus 311, which in this example may be an Ethernet connection. To reduce the amount of data transferred to the processor 306 on the control module 205, the data may be first pre-processed in the master transceiver $301_1$ before it is transferred to the control module 205. In a general aspect therefore, the processor 306 may be distributed between the control module 205 and the plurality of transceivers $301_{1,2}$ rather than being located wholly in the control module 205, an advantage of which is to reduce the amount of data needing to be transferred using the, typically slower speed, communications bus 311 by enabling some pre-processing to be carried out on the transceivers $301_{1,2}$.

A further example implementation of a radar system 400 is illustrated in FIG. 4, in which the transceivers $401_{1,2}$ are co-located, i.e. provided together on a common circuit board or package. A master transceiver $401_1$ and a slave transceiver $401_2$ are shown in FIG. 4. Further slave transceivers may be added to the system 400 as required. In this example it may not be necessary to connect all the transceivers $401_{1,2}$ separately to a common communication bus 411 and gateway 403 to transfer data to the control module 405 and synchronize the radar system 400 in frequency. Instead, for co-located transceivers $401_{1,2}$ only one of the transceivers (i.e. the master $401_1$) may have communication with the control module 205, for example via the communications bus 411. The master transceiver $401_1$ operates to recover the clock signal from the communications bus 411 and provides the clock reference to the slave transceiver $401_2$. The phase difference between the transceivers $401_{1,2}$ can be calculated either through coupling between the antennas or by using the strongest target common to the coherent and noncoherent apertures, as detailed above in relation to FIG. 2. The data can be transferred from each slave to the master transceiver $401_1$ to be processed to be transferred over the communications bus 411 to the common control module 205 or can be transferred to a co-located processing unit. Data transfer between the collocated systems (transceiver and or microprocessors) can be done through a high-speed data bus like MIPI-CSI2 or PCI Express. In a general aspect therefore, two or more of the plurality of transceivers may be co-located on a common circuit board or package.

Figure 5:
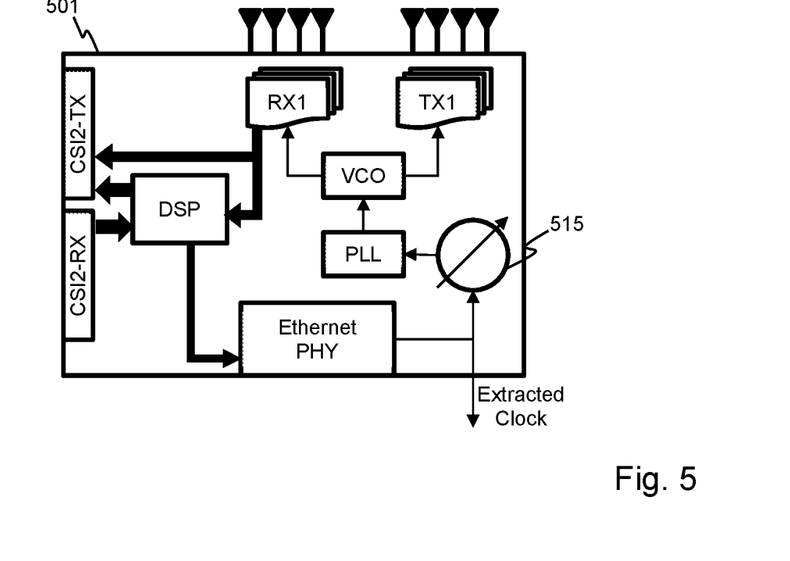
FIG. 5 is a schematic diagram of an example radar transceiver with a phase shifted output clock signal.

For any of the above-mentioned example implementations, it is important to keep the phase of the reference clock between the transceivers constant. A first way of achieving this is to control the electrical length of a connection, such as an ethernet cable, between each of the devices (i.e. between the transceivers and the gateway). This is, however, impractical in any realistic implementation. A second option is to implement a phase shifter in the clock recovery circuit in order to compensate for phase mismatches between reference clocks of the transceivers, as illustrated in FIG. 5. Once a phase difference has been calculated between each of the plurality of transceivers, a phase shifter 515 on one or more of the transceivers 501 can be used to adjust the phase of the extracted clock signal so that each of the transceivers can subsequently transmit frequency and phase synchronised signals. FIG. 5 illustrates an example single transceiver 501, which may for example correspond with the master transceiver of FIG. 4, in which the extracted clock signal is provided by the master transceiver to each of the slave transceivers. In other implementations each transceiver may provide its own extracted clock signal and comprise a phase shifter 515 to adjust its extracted clock signal to match that of the master transceiver.

The described concept can be applied to co-located as well as non-co-located radar systems. In a co-located radar system, all the transceivers are located on the same PCB or package. One of the main advantages of the proposed concept is that there is no necessity to distribute a high frequency signal from a master device to multiple slave devices. There are also two further advantages. Firstly, the transceivers can be positioned in the PCB in a more flexible way, thereby reducing the distance between the transceiver and the antennae. Secondly, if the antennae are already integrated into the transceiver or if there is an interface to 3D antennas integrated into the transceiver, there is no necessity to use expensive high frequency PCB substrates.

Figure 6:
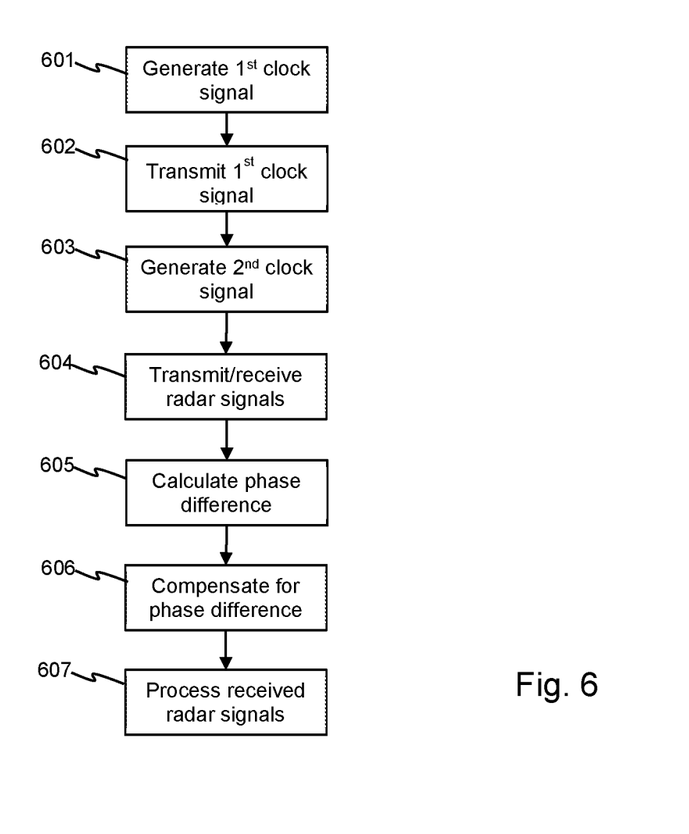
FIG. 6 is a schematic flow diagram illustrating a method of operating a radar system having multiple transceivers.

FIG. 6 illustrates an example method of operating a radar system of the types as described above. The method comprises generating a first clock signal (step 601), which is done by the control module 205. The first clock signal, which may for example be within a first frequency range of 10-100 MHz, is transmitted via the communications bus to one or more of the plurality of transceivers (step 602). The clock signal may for example be sent to each of the transceivers individually or may be sent to only one of the transceivers. One or more of the plurality of transceivers then generates a second clock signal extracted from the first clock signal (step 603). The second clock signal may for example be within a radar range of frequencies, i.e. within the range of 10-100 GHz. In some cases the extracted second clock signal is sent from one of the transceivers to one or more of the other transceivers, for example in cases where the transceivers are co-located, while in other cases each of the transceivers may generate its own extracted second clock signal. Each of the plurality of transceivers then transmits and receives frequency synchronised radar signals based on the second clock signal (step 604). Based on these radar signals, the processing module 206, whether provided within the control module 205 or distributed between the control module 205 and each of the transceivers, calculates a phase difference between the frequency synchronized radar signals (step 605), i.e. between a master transceiver and each of the other transceivers. The processing module then compensates for the measured phase difference (step 606) and processes received radar signals from the plurality of transceivers (step 607). Steps 606 and 607 may involve processing the received radar signals to account for the phase differences or may involve first adjusting a phase of the second clock signal in each of the plurality of transceivers so that the radar signals are frequency and phase synchronized.

From reading the present disclosure, other variations and modifications will be apparent to the skilled person. Such variations and modifications may involve equivalent and other features which are already known in the art of radar systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A radar system comprising:
a control module;
a processing module;
a plurality of radar transceivers; and
a communications bus connecting the control module to one or more of the plurality of radar transceivers,
wherein the control module is configured to generate a first clock signal and transmit the first clock signal via the communications bus to one or more of the plurality of transceivers and to receive radar data from the plurality of transceivers via the communications bus,
wherein each of the plurality of transceivers is configured to generate a second clock signal extracted from the first clock signal and to transmit and receive frequency synchronized radar signals based on the second clock signal,
and wherein the processing module is configured to: calculate a phase difference between the frequency synchronized radar signals; compensate for the calculated phase difference; and process received radar signals from the plurality of transceivers.

2. The radar system of claim 1, wherein the communications bus connects the control module to each one of the plurality of radar transceivers, each of the plurality of radar transceivers being configured to receive the first clock signal from the control module via the communications bus.

3. The radar system of claim 1, wherein the processing module is configured to calculate the phase difference between a radar signal transmitted from a first one of the plurality of transceivers and a second one of the plurality of transceivers from a signal transmitted from a first one of the plurality of transceivers and received by the second one of the plurality of transceivers.

4. The radar system of claim 1, wherein the processing module is configured to calculate the phase difference between a radar signal transmitted from a first one of the plurality of transceivers and a second one of the plurality of transceivers from signals transmitted and received by each of the first and second ones of the plurality of transmitters and reflected from a common feature.

5. The radar system of claim 1, wherein each transceiver is connected to an adjacent transceiver via a data bus.

6. The radar system of claim 1, wherein two or more of the plurality of transceivers are co-located on a common circuit board or package.

7. The radar system of claim 1, wherein each of the plurality of transceivers comprises a phase adjuster configured to adjust a phase of the second clock signal, the processing module being configured to operate the phase adjuster to compensate for the calculated phase difference.

8. The radar system of claim 1, wherein the second clock signal has a frequency of at least 10 GHz and the frequency of the first clock signal is 100 MHz or lower.

9. The radar system of claim 1, wherein the communications bus comprises a communications bus gateway coupled to the communications bus and coupled between the plurality of transceivers and the control module.

10. A method of operating a radar system comprising a control module, a processing module, a plurality of radar transceivers and a communications bus connecting the control module to one or more of the plurality of radar transceivers, the method comprising:
generating, by the control module, a first clock signal;
transmitting, by the control module, the first clock signal via the communications bus to one or more of the plurality of transceivers;
receiving, by the control module, radar data from the plurality of transceivers via the communications bus;
generating by one or more of the plurality of transceivers a second clock signal extracted from the first clock signal;
transmitting and receiving frequency synchronized radar signals by each of the plurality of transceivers based on the second clock signal;
calculating by the processing module a phase difference between the frequency synchronized radar signals;
compensating by the processing module for the calculated phase difference; and
processing by the processing module received radar signals from the plurality of transceivers.

11. The method of claim 10 comprising adjusting a phase of the second clock signal in each of the transceivers with a phase adjuster to compensate for the calculated phase difference.

12. The method of claim 10, wherein the processing module calculates the phase difference between a radar signal transmitted from a first one of the plurality of transceivers and a second one of the plurality of transceivers from a signal transmitted from a first one of the plurality of transceivers and received by the second one of the plurality of transceivers.

13. The method of claim 10, wherein the processing module calculates the phase difference between a radar signal transmitted from a first one of the plurality of transceivers and a second one of the plurality of transceivers from signals transmitted and received by each of the first and second ones of the plurality of transmitters and reflected from a common feature.

14. The method of claim 10, wherein the second clock signal has a frequency of at least 10 GHz and the frequency of the first clock signal is 100 MHz or lower.

15. A radar system comprising:
a control module;
a processing module;
a plurality of radar transceivers;
a data bus interconnecting the plurality of radar transceivers; and
a communications bus connecting the control module to one or more of the plurality of radar transceivers,
wherein the control module is configured to generate a first clock signal and transmit the first clock signal via the communications bus to one or more of the plurality of transceivers and to receive radar data from the plurality of transceivers via the communications bus,
wherein each of the plurality of transceivers is configured to use the first clock signal to generate a second clock signal and to transmit and receive frequency synchronized radar signals based on the second clock signal, and
wherein the processing module is configured to: calculate a phase difference between the frequency synchronized radar signals; compensate for the calculated phase difference; and process received radar signals from the plurality of transceivers.

16. The radar system of claim 15, wherein the communications bus connects the control module to each one of the plurality of radar transceivers, each of the plurality of radar transceivers being configured to receive the first clock signal from the control module via the communications bus.

17. The radar system of claim 15, wherein the processing module is configured to calculate the phase difference between a radar signal transmitted from a first one of the plurality of transceivers and a second one of the plurality of transceivers from a signal transmitted from a first one of the plurality of transceivers and received by the second one of the plurality of transceivers.

18. The radar system of claim 15, wherein the processing module is configured to calculate the phase difference between a radar signal transmitted from a first one of the plurality of transceivers and a second one of the plurality of transceivers from signals transmitted and received by each of the first and second ones of the plurality of transmitters and reflected from a common feature.

19. The radar system of claim 15, wherein the second clock signal has a frequency of at least 10 GHz and the frequency of the first clock signal is 100 MHz or lower.

* * * * *